US012434356B2

(12) United States Patent
Ye et al.

(10) Patent No.: US 12,434,356 B2
(45) **Date of Patent: *Oct. 7, 2025**

(54) REVERSIBLE RATCHET TOOL

(71) Applicants: Hangzhou Uni-Hosen Electromechanical Tools Co., Ltd., Zhejiang (CN); Allied International LLC., Valencia, CA (US)

(72) Inventors: Jingrong Ye, Hangzhou (CN); Timonthy Florian, Valencia, CA (US); Weikai Yang, Zhejiang (CN)

(73) Assignees: Hangzhou Uni-Hosen Electromechanical Tools, Co., Ltd., Hangzhou (CN); Allied International LLC, Valencia, CA (US)

( * ) Notice: Subject to any disclaimer, the term of this patent is extended or adjusted under 35 U.S.C. 154(b) by 529 days.

This patent is subject to a terminal disclaimer.

(21) Appl. No.: 17/830,323

(22) Filed: Jun. 1, 2022

(65) Prior Publication Data

US 2022/0402103 A1 Dec. 22, 2022

Related U.S. Application Data

(63) Continuation of application No. 16/794,238, filed on Feb. 19, 2020, now Pat. No. 11,376,715.

(51) Int. Cl.
*B25B 13/46* (2006.01)
*B25B 23/00* (2006.01)

(52) U.S. Cl.
CPC ........ *B25B 13/462* (2013.01); *B25B 23/0007* (2013.01)

(58) Field of Classification Search
CPC .................................................... B25B 13/462
USPC ................................. 81/59.1, 58.4, 60, 63.1
See application file for complete search history.

(56) References Cited

U.S. PATENT DOCUMENTS 835,448 A * 11/1906 Lowry et al. ......... B25B 13/462 192/45.01
1,511,226 A * 10/1924 Lawrence ............ B25B 13/462 81/59.1
4,457,416 A * 7/1984 Kutzler ................. B25B 13/462 81/63.1
5,007,514 A * 4/1991 Hattori .................. F16D 41/067 192/45.012
2005/0120832 A1* 6/2005 Chiang ................. B25B 13/461 81/59.1
2015/0135498 A1* 5/2015 Gillikin ..................... B25F 1/02 29/76.1
2020/0180121 A1* 6/2020 Chang .................. B25B 13/462

* cited by examiner

*Primary Examiner* — Hadi Shakeri
(74) *Attorney, Agent, or Firm* — Raymond Y Chan; David & Raymond Patent Firm

(57) ABSTRACT

A reversible ratchet tool includes a cage-type reversing mechanism including a cage member for shifting rollers from their first positions to their second positions. The structure and configuration of the cage member is improved with resilient members for preventing the rollers being stuck unintentionally when the rollers are positioned either in the corresponding first positions or the corresponding second positions, while being capable of maintaining and restricting the rollers upright in place when the rollers are shifted from the corresponding first positions to the corresponding second positions.

19 Claims, 7 Drawing Sheets

REVERSIBLE RATCHET TOOL

CROSS REFERENCE OF RELATED APPLICATION

This application is a Continuation application that claims the benefit of priority under 35 U.S.C. § 120 to a non-provisional application, application Ser. No. 16/794,238, filed Feb. 19, 2020, which is incorporated herewith by reference in its entirety.

BACKGROUND OF THE PRESENT INVENTION

Field of Invention

The present invention relates to a tool for applying a torque to an object, and more particularly to a reversible ratchet tool with cage-type reversing mechanism.

Description of Related Arts

Reversible ratchet tools, such as socket wrenches and drivers, are commonly used in automotive, industrial, and house-hold applications to install and remove work pieces such as threaded fasteners and to apply an amount of torque and/or angular displacement to work piece, for example.

Various biasing mechanisms within ratchet tools are configured to prevent rotation of a ratchet driving head with respect to the tool handle in one direction and to allow rotation of the ratchet head with respect to the tool handle in another direction. This allows the drive head to apply torque to a fastener through large angle by repeatedly swinging smaller angular movement of the tool handle without disengaging the tool head from the fastener after each movement.

For conventional ratchet tools, the smaller angular movements on each store must reach at least a minimum angular displacement to overcome backlash and cumulative dimensional variations of the tool components within manufacturing tolerances. Backing the handle of a ratchet tool through some minimum angular displacement after each movement provides sufficient rotation of the ratchet body relative to a driving member to overcome the backlash and dimension variations to configure the tool for applying a torque on a following movement.

Although the conventional ratchet tool which requires an excessive angular displacement of the handle may be usable in confined space, it is always desired to reduce or eliminate the minimum angular displacement of the conventional ratchet tools in order to allow the use of the ratchet tool in certain locations where the angular displacement of the handle are limited and obstructed.

For example, U.S. Pat. No. 9,296,093B2 discloses a reversible ratchet tool intended to reduce relative rotation between a ratchet body and a driving member, which includes a cage-type reversing mechanism for selectively shifting rollers, which is retained by a cage member between the ratchet body and the driving member, in either a first position that the driving member is only allowed to be actuated in a first rotation direction, or a second position that the driving member is only allowed to be actuated in a second rotation direction opposite to the first rotation direction of the cage member.

However, such cage-type revising mechanism has many disadvantages as follows.

As indicted in the disclosure of the patent, the cage member includes an annular base and a plurality of fingers axially extended from one side of the annular base, wherein the rollers are each constrained between a corresponding pair of the fingers of the cage member while the fingers of the cage member are configured to shift the rollers from their corresponding first positions to their corresponding second positions. However, the roller(s) may get tilted accidentally during its travel from the corresponding first position to the corresponding second position, if the angular space between each pair of the fingers is relatively too large with respective to the roller.

In order to eliminate the unintentional tilt of the rollers, the fingers of the cage member are intended to be arranged in a smaller angular distance, so that the rollers can be each substantially fitted between each pair of the fingers correspondingly to reduce its shifting travel length. However, if the angular distance of each pair of the fingers is minimized, the corresponding roller may get stuck between the pair of fingers, the driving body and the driving member when the rollers are positioned in either the corresponding first positions or the corresponding second positions, such that it is unable to drive back the tool handle for applying torque on a following movement.

In other words, the annular distance between each pair of the fingers in the cage-type revising mechanism is a contradictory parameter, larger or smaller angular distance is neither not suitable. That is one of the main reasons that causes the existing reversible ratchet tool has a relatively unstable performance and is unable to bear excessive loads.

In addition, though the conventional reversible ratchet tool including the cage-type revising mechanism is able to be utilized in confined space as indicated in the disclosure of the patent, the conventional reversible ratchet tool fails to be used in a space where the tool is only allowed to work with a swing arc less than 5°, as tested.

SUMMARY OF THE PRESENT INVENTION

The invention is advantageous in that it provides a reversible ratchet tool which can be utilized in confined locations where the tool is competent to work with a swing arc less than 5 degrees.

Another advantageous of the present invention is to provide a reversible ratchet tool, wherein the angular distance between each pair of fingers of the cage member is large enough for preventing the rollers being stuck unintentionally when the rollers are located either in their first positions or their second positions, and that a resilient member is provided in each pair of fingers of the cage member for substantially reducing the angular distance between each two adjacent fingers and is configured for maintaining the rollers being arranged upright in place during travelling from the corresponding first positions to the corresponding second positions while the driving direction of the reversible ratchet tool is reversed.

Another advantageous of the present invention is to provide a reversible ratchet tool, wherein the reserving mechanism is embodied as a magnetic reserving mechanism in one embodiment for prolonging the life span of the ratchet tool.

Another advantageous of the present invention is to provide a cage member for a reversible ratchet tool that is able to incorporate with any existing cage-type reversing mechanism to improve the performance of the ratchet tool.

Another advantageous of the present invention is to provide an improved cage member and a reserving mechanism for a reversible ratchet tool which enables the reversible ratchet tool to bear a relative excessive load compared with the existing conventional reversible ratchet tool.

Another advantageous of the present invention is to provide a reversible ratchet tool, which is capable of operating in its free-spinning and driving directions in a noiseless manner.

Another advantageous of the present invention is to provide a reversible ratchet tool, wherein no expensive or complicated structure is required to be employed in the present invention in order to achieve the above-mentioned advantageouses. Therefore, the present invention successfully provides an economic and efficient solution for improving the performance of the ratchet tool especially in its reversing operation.

According to the present invention, the foregoing and other objects and advantages are attained by a reversible ratchet tool, comprising:

- a ratchet body having a circular inner surface defining a circular aperture;
- a cage member, disposed in the circular aperture of the ratchet body, having a central cage aperture axially and a plurality of cage spaces formed intervally and radially, wherein the cage member further comprises a plurality of resilient members arranged in the cage spaces respectively;
- a reverser knob coaxially coupled to the annular base of the cage member to enclose the circular aperture, wherein the reverser knob has a central aperture communicating with the cage aperture;
- a driving member comprising an axle portion extended through the cage aperture of the cage member and rotatably retained with the reverser knob;
- a plurality of rollers disposed between the ratchet body and driving member, each of which is retained by the cage member between two corresponding adjacent fingers of the plurality of fingers; and
- a reversing mechanism configured to shift the reverser knob and the driving member from a first angular displacement to a second angular displacement, wherein the cage member is adapted to shift the rollers from their first positions to their second positions on the driving member when the reverser knob and the driving member are shifted from the first angular displacement to the second angular displacement, wherein the resilient members are respectively adapted to maintain the rollers upright in place within the cage spaces respectively while the rollers are being shifted from the corresponding first positions to the corresponding second positions.

In one embodiment of the present invention, the cage member comprises an annular base and a plurality of fingers axially and intervally extending from the annular base, and the plurality of resilient members arranged with respect to the plurality of fingers respectively;

In one embodiment of the present invention, the fingers of the cage member are arranged intervally to define a plurality of cage spaces intervally and radially between every two adjacent fingers of the plurality of fingers respectively, wherein the rollers are disposed in the plurality of cage spaces respectively. In other words, each two adjacent fingers of plurality of fingers of the cage member has one roller disposed therebetween, wherein each two adjacent fingers of the plurality of fingers are arranged with a certain angular distance to define the respective cage space therebetween that allows the respective roller disposed therein to move and shift between the two adjacent fingers freely.

In one embodiment of the present invention, the plurality pairs of resilient arms are arranged in the plurality of cage spaces respectively and adapted to bias and shift the rollers disposed in the cage spaces respectively from the corresponding first positions to the corresponding second positions on the driving member.

In one embodiment of the present invention, each pair of the resilient members are provided on two facing sidewalls of the respective pair of the fingers respectively while facing with each other.

In one embodiment of the present invention, each of the resilient members comprises at least one resilient arm extended from a sidewall of a finger to provide a resilient ability to the roller disposed in the cage space defined between the finger and another adjacent finger, such that the resilient arm is able to maintain the roller uprightly in the cage space when the roller is being shifted from a first position to a second position.

In one embodiment of the present invention, each of the resilient members provided on a sidewall of a finger comprises a joint portion adapted to be coupled with the sidewall and a first and a second resilient arms inclinedly extended from the joint portion outwardly in opposing direction to form a general V shape so as to provide a resilient ability with respect to the roller disposed in the cage space defined between the finger and another adjacent finger, such that the first and second resilient arms are able to maintain the roller uprightly in the cage space when the roller is being shifted from a first position to a second position.

In one embodiment of the present invention, a first inclined angle defined between the first resilient arm and the sidewall of the corresponding finger is equal to the second inclined angle defined between the second resilient arm and the sidewall of the corresponding finger.

In one embodiment of the present invention, each resilient arm further comprises a joint portion integrally formed between the first resilient arm and the second resilient arm to integrally couple to the sidewall of the corresponding finger.

In one embodiment of the present invention, the driving member has a shoulder facing a bottom side of the reverser knob, wherein the reverser knob is made of magnetic attraction material and has two pawl cavities intendedly formed at the bottom side of the reverser knob and displaced from each other, wherein the reversing mechanism comprises a magnetic unit engaged in the shoulder of the driving member, wherein the magnetic unit is sized to fit in either one of the pawl cavities and retained in either one of the pawl cavities by magnetic attraction force.

In one embodiment of the present invention, the shoulder has a pocket facing the bottom side of the reverser knob, wherein the magnetic unit is disposed in the pocket.

In one embodiment of the present invention, the magnetic unit is sized to partially fit and disposed in the pocket.

In one embodiment of the present invention, the magnetic unit is a ball magnet.

In one embodiment of the present invention, the magnetic unit is integrally formed on the shoulder of the driving member.

In one embodiment of the present invention, the driving member has a shoulder facing a bottom side of the reverser knob, wherein the shoulder has a pocket and the reverser knob has two pawl cavities intendedly formed at the bottom side of the reverser knob and displaced from each other, wherein the reversing mechanism comprises a pawl spring retained in the pocket and a pawl ball sized to fit in either one of the pawl cavities and compressed between the pawl ball and the driving member.

In one embodiment of the present invention, the driving member further comprises a driving body arranged coaxially around the axle portion, wherein the driving body, having a polygonal cross sectional shape, has an outer sector surface having a plurality of ramps.

In one embodiment of the present invention, the driving member further comprises a driver element extending from the driving body coaxially with the axle portion.

In one embodiment of the present invention, the driver element forms a square socket drive.

In one embodiment of the present invention, the cage member is coupled to the reverser knob with pins.

In one embodiment of the present invention, the cage member further comprises an annular flange coupled on the free ends of the fingers.

In one embodiment of the present invention, the rollers are sized to fit between the annular flange and the annular base.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1A:
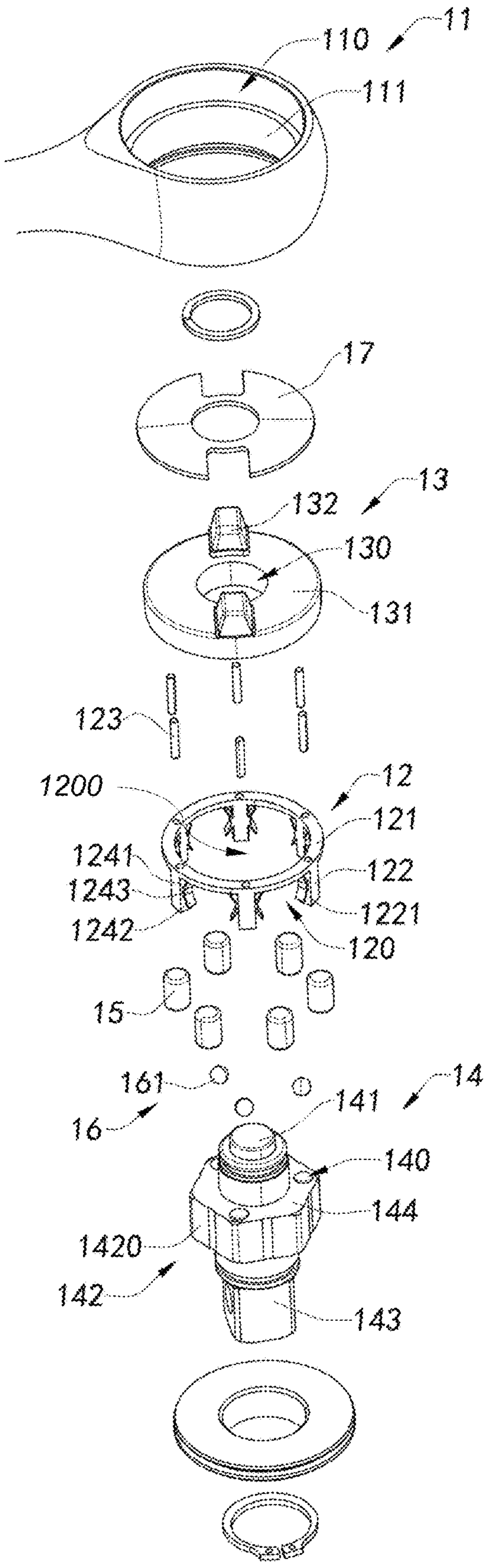
FIG. 1A is an exploded top perspective view illustrating a reversible ratchet tool according to a first preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. just indicate relations of direction or position are based on the relations of direction or position shown in the appended drawings, which is only to facilitate descriptions of the present invention and to simplify the descriptions, rather than to indicate or imply that the referred device or element must apply specific direction or to be operated or configured in specific direction. Therefore, the above mentioned terminologies shall not be interpreted as confine to the present invention.

It is understandable that the term "a" should be understood as "at least one" or "one or more". In other words, in one embodiment, the number of an element can be one and in other embodiment the number of the element can be greater than one. The term "a" is not construed as a limitation of quantity.

Referring to FIGS. 1A to 3B of the drawings, an reversible ratchet tool according to a first preferred embodiment of the present invention is illustrated, wherein the reversible ratchet tool comprises a ratchet body 11 having a general ring shape and defining a circular aperture 110 therein, a cage member 12 sized to fittingly install in the circular aperture 110 of the ratchet body 11, a reverser knob 13 coaxially coupled to the cage member 12, and a driving member 14 rotatably retained by the reverser knob 13. A plurality of rollers 15, each having a round pillar shape, is constrained by the cage member 12 between an inner surface 111 of the ratchet body 11 and the driving member 14.

According to the first preferred embodiment of the present invention, the reversible ratchet tool further comprises a reversing mechanism 16 configured to shift the reverser knob 13 and the driving member 14 from a first angular displacement to a second angular displacement. The cage member 12 is adapted for the rollers 15 to be shifting from their corresponding first positions to their corresponding second positions on the driving member 14 while the reverser knob 13 and the driving member 14 are shifted from the first angular displacement to the second angular displacement respectively. The round pillar shaped rollers 15 are sized to selectively prevent relative motion between the ratchet body 11 and the driving member 14 only in a first rotation direction when the rollers 15 are in their corresponding first positions, and to prevent relative motion between the ratchet body 11 and the driving member 14 only in a second rotation direction opposite to the first rotation direction when the rollers 15 are in their corresponding second positions. According to the first preferred embodiment of the present invention, the improved structure of the cage member 12 can prevent the rollers 15 from being stuck unintentionally when the rollers 15 are located either in the first positions or the second positions thereof while each of the rollers 15 is able to be maintained in upright position when being shifted from the first position to the second position.

According to the first preferred embodiment of the present invention, the cage member 12 includes an annular base 121 and a plurality of fingers 122 axially and intervally extended from one side of the annular base 121 to define a central cage cavity 1200 surrounding by the fingers 122, wherein a cage space 120 is formed between every two adjacent fingers 122 of the plurality of fingers 122. Alternatively speaking, the cage member 12 can be embodied as a ring shape body having a plurality of arc shape receiving slots intervally formed therearound as the cage spaces 120.

Figure 1B:
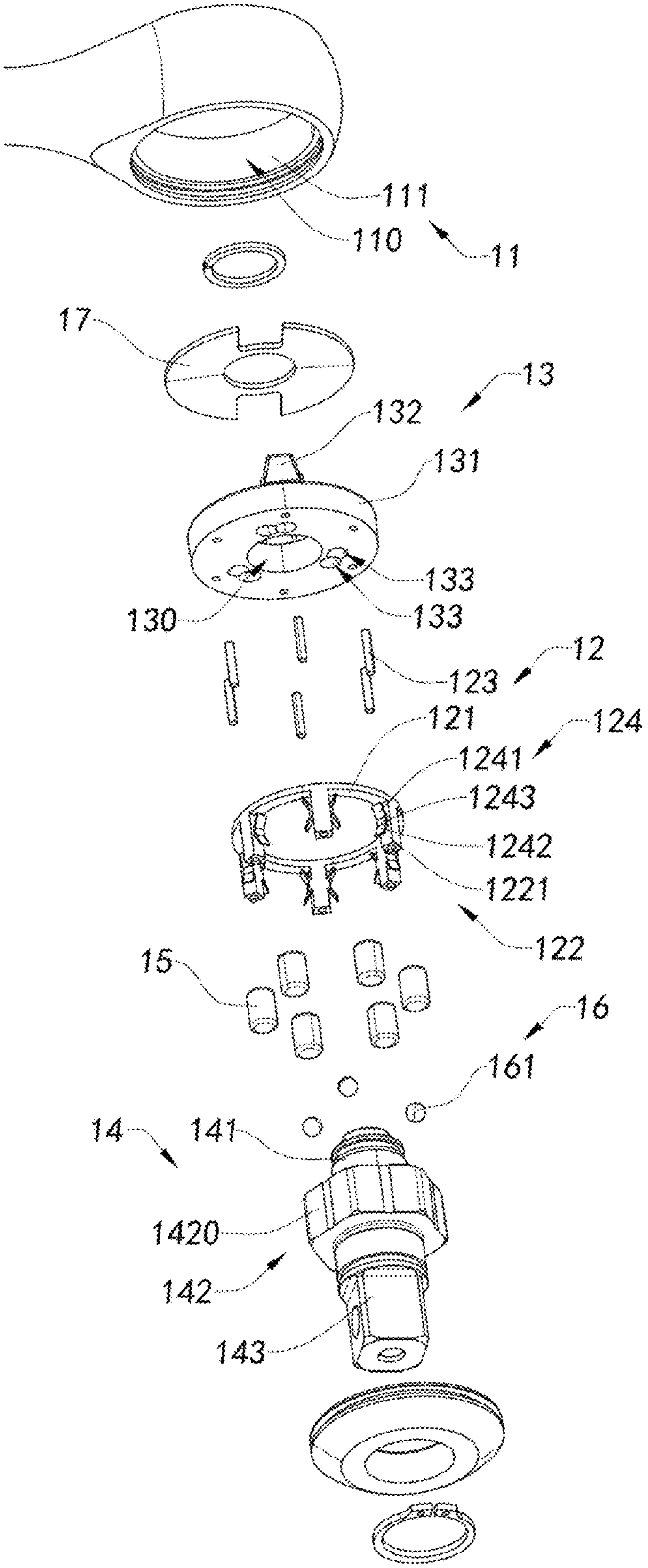
FIG. 1B is an exploded bottom perspective view illustrating the reversible ratchet tool according to the first preferred embodiment of the present invention.
Figure 3A:
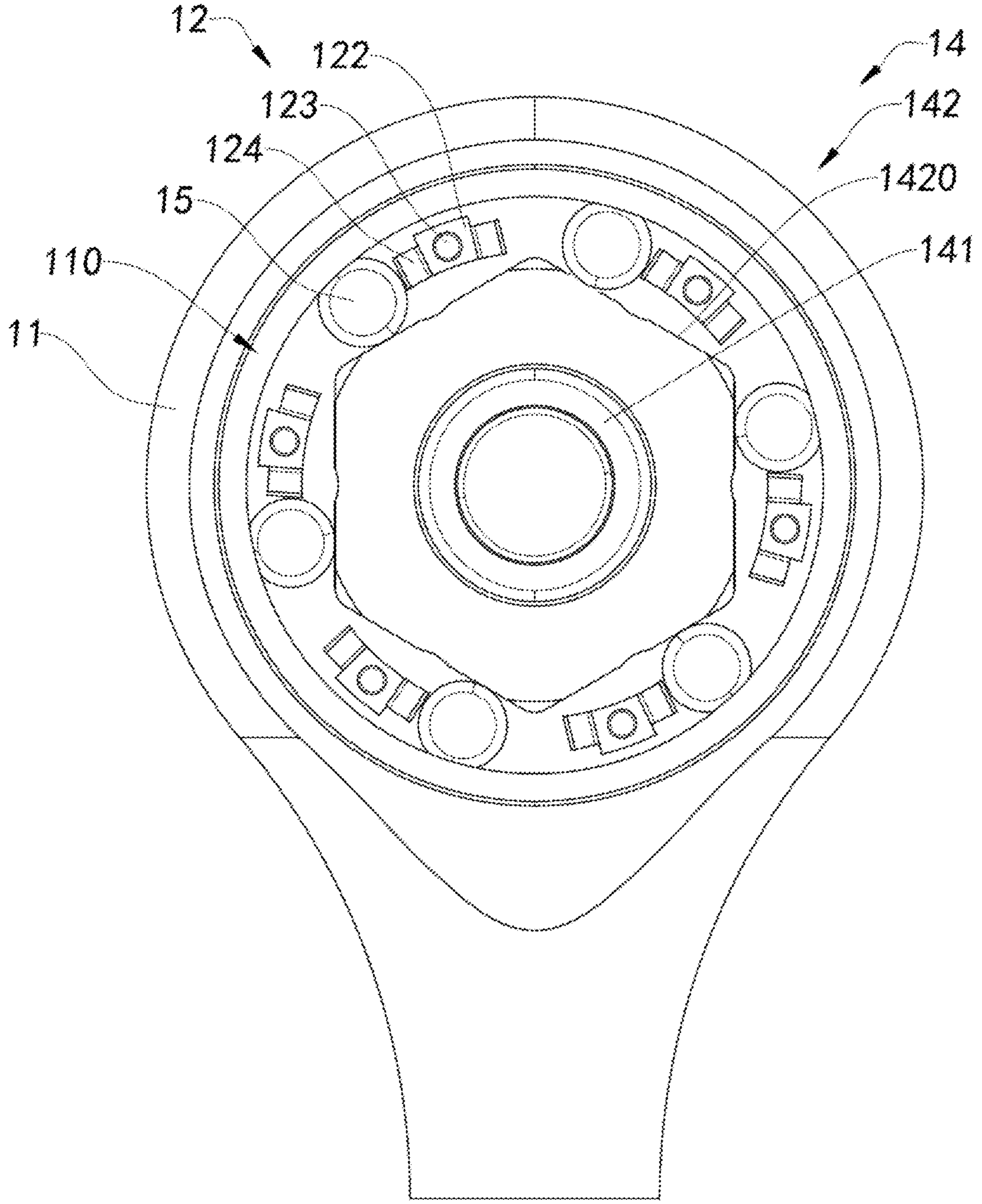
FIG. 3A is a schematic view of the reversible ratchet tool configured to apply a torque in a first rotation direction according to the first preferred embodiment of the present invention.
Figure 3B:
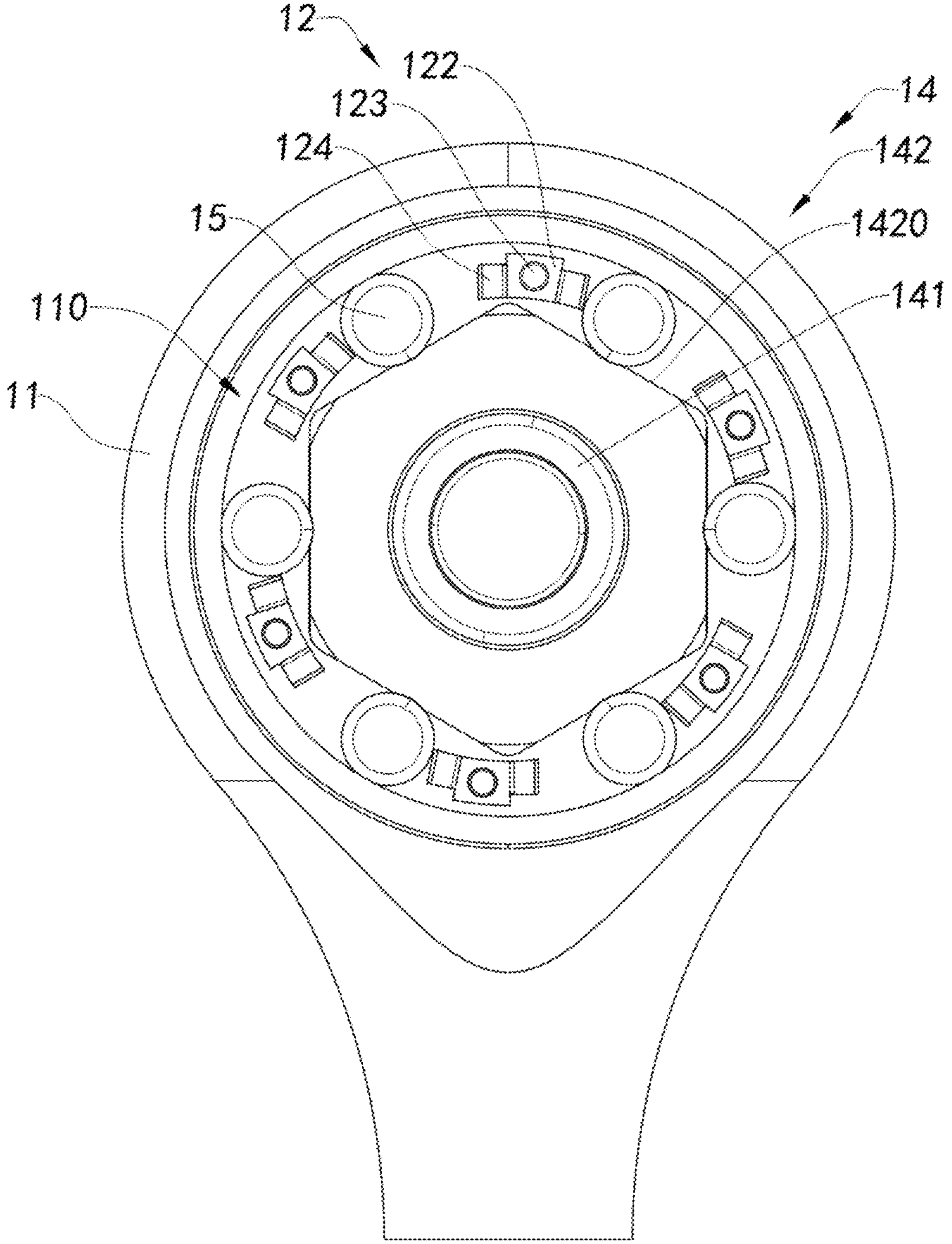
FIG. 3B is a schematic view of the reversible ratchet tool configured to apply a torque in a second rotation direction according to the first preferred embodiment of the present invention.

As shown in FIGS. 1A and 1B, according to the first preferred embodiment of the present invention, six fingers 112 are integrally and intervally extended from a bottom side of the ring-shaped annular base 121 longitudinally to define six arc-shaped cage spaces 120 each of which is formed between two adjacent fingers 122. As shown in FIGS. 3A and 3B, the annular base 121 is sized to fittingly and coaxially disposed in the circular aperture 110 of the ratchet body 11, such that the inner surface 111 of the ratchet body 11 forms an outer surrounding wall of the cage spaces 120 and the fingers 122 are sized to substantially avoid contacting with the inner surface 111 of the ratchet body 11.

According to the first preferred embodiment, the cage member 12 further comprises a plurality pair of resilient members 124 provided in the plurality of cage spaces 120 respectively. In other words, each pair of the resilient members 124 are provided between two adjacent fingers 122. Two sidewalls 1221 of each finger 122 forms two side surrounding walls of two adjacent cage spaces 120 respectively.

According to the first preferred embodiment of the present invention, the reverser knob 13 comprises an annular reverser base 131 having a central aperture 130 and at least a reverser lever 132 protrudingly provided on a top side of the annular reverser base 131, wherein the annular reverser base 131 is sized to fittingly and rotatably retain at an upper portion of the circular aperture 110 of the ratchet body 11.

The cage member 12 is disposed in the circular aperture 110 of the ratchet body 11 and coupled to a bottom side of the annular reverser base 131 of the reverser knob 13 to form an integral structure, such that the reverser knob 13 is capable of actuating the cage member 12 in either clockwise or counterclockwise direction of rotation via the reverse lever 132. According to the first preferred embodiment, a depression element 17, such as a depression spring, is configured to be mounted to a top end of the circular aperture 110 of the ratchet body 11 and pressed on the top side of the reverser knob 13 so as to retain the reverser knob 13 at the upper portion of the circular aperture 110 of the ratchet body 11.

According to the first preferred embodiment of the present invention, as shown in FIGS. 1A to 3B, the cage member 12 further comprises a plurality of coupling pins 123 each of which has one end fixedly inserted into a corresponding base hole 1310 formed in the bottom side of the annular reverser base 131 and another end fixedly inserted into a corresponding cage hole 1210 formed in a top side of the annular base 121 of the cage member 12, wherein the cage holes 1210 are preferred to be extended axially in the fingers 122 respectively. In other embodiments, the cage member 12 can be integrally mounted or fastened with the reverser knob 13 by other fastening means such as gluing, screwing, and etc.

It is worth mentioning that the reverser level 131 may be integrally protruded on the top side of the annular reverser base 131 or may be an separate component and detachably coupled on the top side of the annular reverser base 131, which is not intended to be a limitation in the illustrated preferred embodiment.

According to the preferred embodiment of the present invention, the driving member 14 includes an axle portion 141 sized to be rotatably contained in the central aperture 130 of the reverser knob 13, a driving body 142 coaxially protruded around the axle portion 141 and a driver element 143 adapted for engaging with a socket. The axle portion 141 has an upper portion upwardly extended from the driving body 142 to be fittingly fixed in the central aperture 130 of the reverser knob 13 so as to integrally couple the driving member 14 with the reverser knob 13 and a lower portion downwardly extended from the driving body 142 to integrally and coaxially connect with the driver element 143, while the driving body 142 is fittingly disposed in the cage cavity 1200 of the cage member 12.

According to the first preferred embodiment, the driving body 142 has a polygonal cross sectional shape and an outer sector surface 1420 having a plurality of ramps, which is embodied to have a hexagonal shape in correspondence with the six cage spaces 120 and six ramps according to the first preferred embodiment. The driver element 143 of the driving member 14 is coaxially provided below the driving body 142 and coaxial extended from the lower end portion of the axle portion 141. It is worth mentioning that the driver element 143 may be configured as a square socket driver stem or any other commonly known ratchet driving configurations, such as a screw driver head. Other embodiments may be configured with a drill chuck, box end wrench head, or a socket in place of the driving shaft, for example, without departing from the scope and spirit of the present invention.

According to the preferred embodiment of the present invention, the reversing mechanism 16, which is rotatably engaged between the driving member 14 and the reverser knob 13, is configured to shift the reverser knob 13 and the driving member 14 from a first angular displacement to a second angular displacement and constrain the driving member 14 and the reverser knob 13 in either of the first angular displacement or the second angular displacement relative to each other. In the illustrative first preferred embodiment, the driving member 14 has a shoulder 144 facing the bottom side of the reverser knob 13. The reverser knob 13 is made of magnetic attraction material and has one or more pairs of pawl cavities 133 intendedly formed in the bottom side of the reverser knob 13, wherein each pair of pawl cavities 133 are displaced side by side and communicated with each other, as shown in FIG. 1B. In the first preferred embodiment, the reversing mechanism 16 comprises one or more magnetic units 161 engaged in the shoulder 144 of the driving member 14, wherein each of the one or more magnetic units 161 is sized to fit in either one of the respective pair of pawl cavities 133 and retained therein by magnetic attraction force.

According to the first preferred embodiment, the shoulder 144 further has one or more pockets 140 provided facing the bottom side of the reverser knob 13, wherein the one or more magnetic units 161 are sized to partially and fittingly disposed in the one or more pockets 140 respectively. Moreover, the driving member 14, at least the shoulder 144 of the driving member 14, is made of magnetic attraction material, so that the one or more magnetic units 161 are respectively retained in the one or more pockets 140 by magnetic attraction force after being aligned and disposed in the one or more pockets 140. In the first preferred embodiment, the one or more magnetic units 161 may be in a ball shape. It is appreciated that the one or more magnetic unit 161 may be integrally formed on the shoulder 144 of the driving member 14.

According to the first preferred embodiment of the present invention, the reversing mechanism 16 comprises three pairs of the pawl cavities 133 evenly and spacedly formed around the bottom side of the reverser knob 13, wherein three magnetic units are evenly and peripherally formed around the shoulder 144 of the driving member 14 correspondingly.

Figure 2:
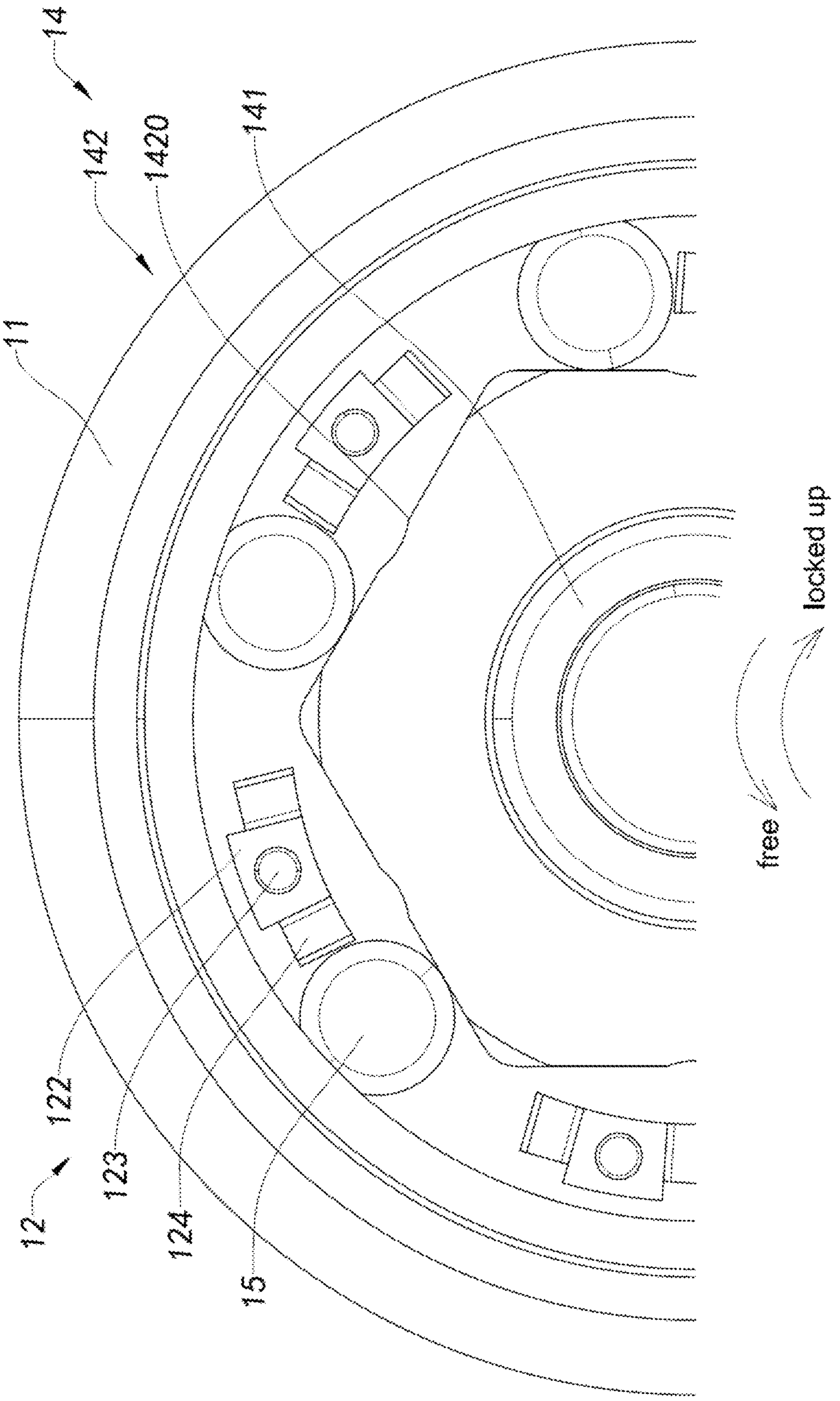
FIG. 2 is a partial schematic view illustrating the rollers binding between a driving member and a ratchet body of the reversible ratchet tool according to the first preferred embodiment of the present invention.

In order for the reversible ratchet tool of the present invention to apply a torque from the ratchet body 11 to the driving member 14, the rollers 15 are frictionally wedged between the inner surface 111 of the ratchet body 11 and the outer sector surface 1420 of the driving body 142 of the driving member 14 within the circular aperture 110 of the ratchet body 11. In the arrangement as shown in FIG. 2, the driving member 14 is allowed to freely rotate counterclockwise within the circular aperture 111 with respect to the ratchet body 11, but is locked-up by the rollers 15 when the driving member 14 rotates in a clockwise direction with respect to the ratchet body 11, thus imparting torque from the ratchet body 11. Correspondingly, when the driving element 143 is engaged with a socket as an example, the ratchet body 11 is free to rotate in a clockwise direction with respect to the driving member 14. However, when the ratchet body 11 is rotated in a counterclockwise direction, the inner surface 111 of the ratchet body 11 drives the rollers 15 to be engaged due to friction between the inner surface 111 of the ratchet body 11 and the outer sector surface 1420 of the driving member 14, such that the counterclockwisely rotating ratchet body 11 drives the driving member 14 to rotate with the ratchet body 11 in the counterclockwise direction simultaneously.

Please referring to FIGS. 2 to 3B, the inner surface 111 of the ratchet body 11 forms the outer surrounding wall of the cage spaces 120 and the outer sector surface 1420 of the driving member 14 forms an inner surrounding wall of the cage spaces 120 so as to further limit the cage spaces 120 to form containing spaces for the rollers 15 respectively. Each of the rollers 15 has a diameter slightly smaller than or equal to a width of the ring shape annular base 121, i.e. the width of the cage spaces 120. Accordingly, the rollers 15 are aligned along the same axial direction of the cage member 12 and contained in the cage spaces 120 respectively. In other words, each cage space 120 is preferred to have one roller 15 disposed therein.

Alternatively speaking, each of the rollers 15 is disposed between two adjacent fingers 122 of the plurality of fingers 122 of the cage member 12 in such a manner that each roller 15 is capable of rolling between the two adjacent fingers 122 within the corresponding cage space 120 defined between the two adjacent fingers 122 as well as the inner surface 111 of the ratchet body 11 and the inner sector surface 1420 of the driving member 14. Also, the fingers 122 are configured to shift the rollers 15 from a first ramp to another adjacent second ramp on the sector surface 1420 when an angular displacement between the driving member 14 and the reverser knob 13 is shifted from a first angular displacement to a second angular displacement. The fingers 122 of the cage member 12 keep rollers 15 in contact with the inner surface 111 of the ratchet body 11 and either the first ramp or the second ramp.

FIG. 3A illustrates the reversible ratchet tool of the present invention configured to apply a torque in a first direction according to the first preferred embodiment, wherein the driving member 14 is prevented from rotating clockwise with respect to the ratchet body 11. Thus, torque would be transmitted from the ratchet body 11 to the driving member 14 by counterclockwise rotation motion of the ratchet body 11.

FIG. 3B illustrates the reversible ratchet tool of the present invention configured to apply a torque in a second direction according to the first preferred embodiment, wherein the driving member 14 is prevented from rotating counterclockwise with respect to the ratchet body 11. Thus, torque would be transmitted from the ratchet body 11 to the driving member 14 by clockwise rotation motion of the ratchet body 11.

To reverse the free-spinning and driving directions of the roller clutch mechanism in the reversible ratchet tool, the cage member 12 is rotated clockwise or counterclockwise with respect to the driving member 14 to shift the rollers 15 from their first positions to their second positions on the driving member 14 correspondingly.

In the first preferred embodiment, each of the rollers 15 is constrained in the respective cage space 120 and between two adjacent fingers 122 of the plurality of fingers 122 of the cage member 12. More specifically, the two adjacent fingers 122 are referred as a pair of fingers 122 which are arranged in a certain angular distance, such that the rollers 15 are capable of moving between the pairs of fingers 122 respectively freely for preventing the rollers 15 being stuck unintentionally by the fingers 122 disposed between the inner surface 111 of the ratchet body 11 and sector surface 1420 of the driving member 14, no matter the rollers 15 are located in the corresponding first positions or the corresponding second positions. In other words, the cage space 120 between each pair of fingers 122 of the cage member 12 is large enough for allowing the reversible ratchet tool to free-spin without applying torque to the driving member 14.

In order for keeping the rollers 15 in upright position, that is axially aligned with the annular base 121 of the cage member 12, during their travelling from the corresponding first positions to the corresponding second positions, the cage member 12 further provides the plurality of resilient members 124 arranged in the cage spaces 120 respectively for reducing a travel distance of each of the rollers 15 in the respective cage space 120 and providing a resilient ability to ensure the rollers 15 travelling within the cage spaces 120 respectively while maintaining their upright manner.

Accordingly, each of the resilient members 124 comprises at least one resilient arm 1241 extended from the sidewall 1221 of the respective finger 122 to provide a resilient ability to the roller 15 disposed in the cage space 122 defined between the two adjacent fingers 122, such that the resilient arm 1241 is able to maintain the roller 15 uprightly in the cage space 122 when the roller 15 is being shifted from the first position to the second position thereof.

According to the first preferred embodiment of the present invention, both sides 1221 of each of the fingers 122 are coupled with resilient members 124. In other words, a pair of the resilient members 124 are provided on both facing sides 1221 of the two adjacent fingers 122 defining the cage space 120 therebetween respectively, which not only substantially reduce the travel distance of the roller 15 between the two adjacent fingers 122, but also provide a resilient uprighting force for keeping the respective roller 15 upright in place during its movement in the respective cage space 120.

According to the first preferred embodiment, each pair of the resilient members 124 provided on the sidewalls 1221 of each pair of the fingers 122 defining the cage space 120 are facing with each other in such a manner that the travel distance of the roller 15 contained in the cage space 120 for traveling between the two adjacent fingers 122 is minimized and the pair of resilient members 124 are configured to apply a resilient bias force to the roller 15 for restricting and maintaining the roller 25 upright in place when the roller 15 is shifted and moved along its travel path from the corresponding first position to the corresponding second position thereof within the respective cage space 120.

According to the first preferred embodiment, each of the resilient members 124 comprises a joint portion 1243 integrally connected to the corresponding sidewall 1221 of the respective finger 122, a first resilient arm 1241 upwardly, outwardly and inclinedly extended from the joint portion 1243, and a second resilient arm 1242 downwardly, outwardly and inclinedly from the joint portion 1243 symmetrically in opposing direction with the first resilient arm 1241 to form a general V shape. Preferably, the first and second resilient arms 1241, 1242 are arranged symmetrically that a first inclined angle defined between the first resilient arm 1241 and the sidewall 1221 of the corresponding finger 122 is equal to a second inclined angle defined between the second resilient arm and the sidewall 1221 of the corresponding finger 122. It is appreciated that the resilient members 124 can be fastened to the sidewalls 1221 by gluing, screwing or etc., or as illustrated in the first preferred embodiment that the resilient members 124 are integrally formed with the sidewalls 1221 of the fingers 122 respectively, so that the resilient member 124 and the sidewall 1221 of the finger 122 are configured in a "K" shape as shown in FIGS. 1A and 1B.

Figure 4:
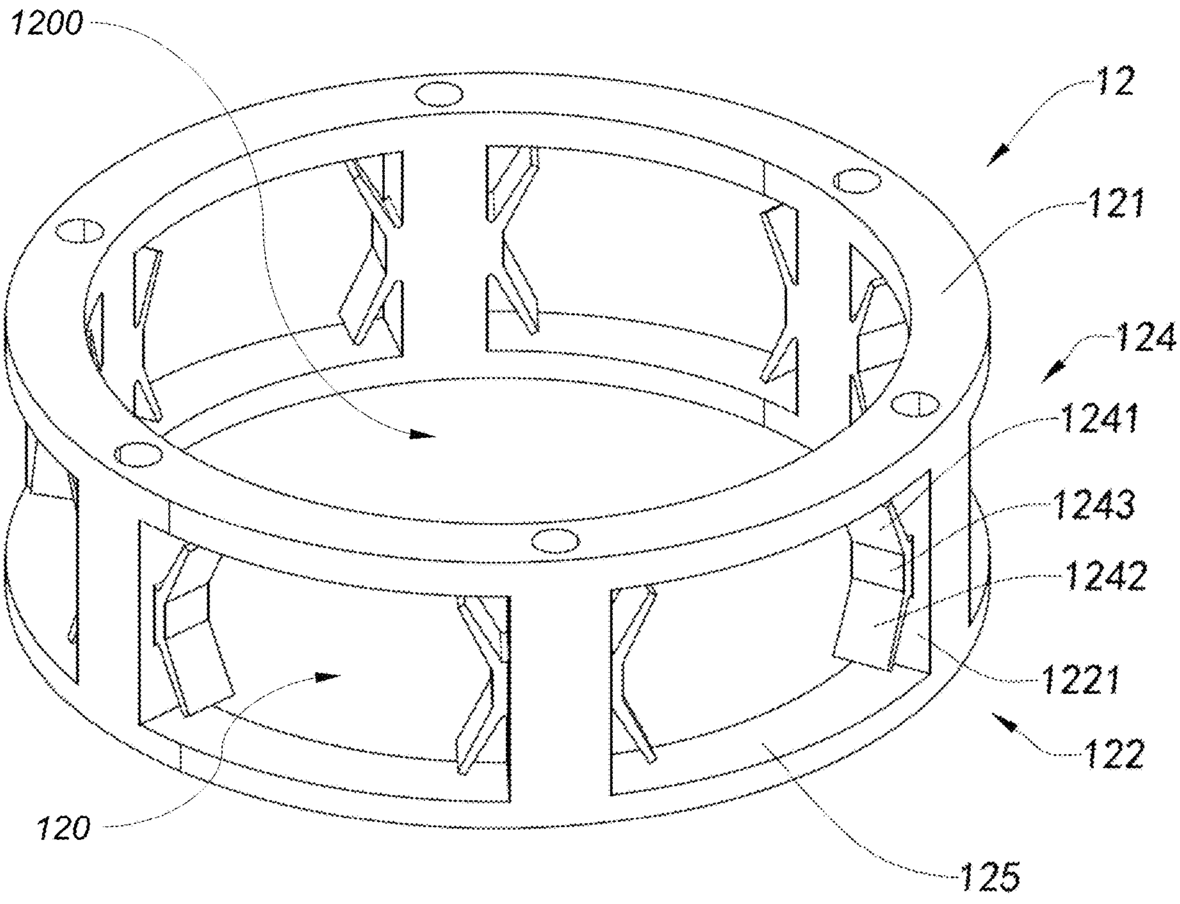
FIG. 4 is a perspective view of a cage member of the reversible ratchet tool according to an alternative mode of first preferred embodiment of the present invention.

Referring to FIG. 4 of the drawings, an alternative mode of the cage member 12 of the reversible ratchet tool according to the first preferred embodiment is illustrated, wherein the cage member 12 is embodied as an ring shape integral body having a plurality of arc shape receiving slots intervally formed therearound as the cage spaces 120. In other words, the cage member 12 further comprises an annular flange 125 integrally coupled on the free ends of the fingers 122 so that the fingers 122 are supported between the annular base 121 and the annular flange 125 to provide a more rigid structure, wherein the rollers 15 are sized to fit in the cage spaces 120 defined between fingers 122, the annular flange 125 and the annular base 121.

It is worth mentioning that the reversible ratchet tool may further comprise a quick release mechanism for releasing the torque applied to the driving member 14 from the ratchet body 11.

Figure 5:
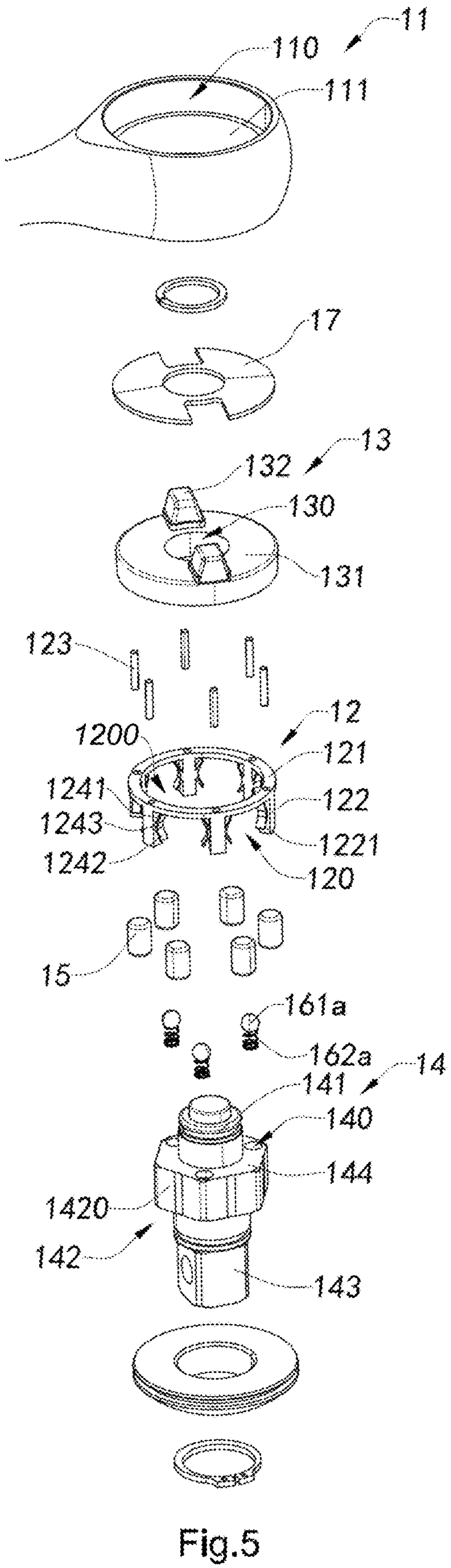
FIG. 5 is an exploded perspective view illustrating a reversible ratchet tool according to a second preferred embodiment of the present invention.

Referring to FIG. 5 of the drawings, a reversible ratchet tool according to a second preferred embodiment of the present invention is illustrated. Compared with the first preferred embodiment, most of the components are the same except the reversing mechanism 16 is modified in the second preferred embodiment. In particular, as shown in the FIG. 5 of the drawings, the driving member 14 has a shoulder 144 facing a bottom side of the reverser knob 13, wherein the shoulder 144 has one or more pockets 140 formed therein. Correspondingly, the reverser knob 13 has one or more pairs of pawl cavities 133 intendedly formed in the bottom side of the reverser knob 13, wherein the pair of pawl cavities 133 are formed in a side by side manner and communicated with each other like the first preferred embodiment as shown in FIG. 1B. In addition, the reversing mechanism 16 comprises one or more pawl springs 162A retained in the one or more pockets 140 respectively and one or more pawl balls 161A sized to fit in either one of the pair of pawl cavities 133, wherein the one or more pawl springs 162A are compressed between the one or more pawl balls 161A and the driving member 14.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A reversible ratchet tool, comprising:

a ratchet body having an inner surface defining a circular aperture therein;

a cage member, disposed in said circular aperture of said ratchet body, which is a ring shape integral body having a central cage aperture axially and a plurality of cage spaces formed intervally and radially, and comprising a plurality of pairs of resilient members arranged in said cage spaces respectively;

a reverser knob, coaxially coupled to said cage member, having a central aperture communicating with said cage aperture;

a driving member rotatably including an axle portion extended through said cage aperture of said cage member and rotatably retained with the reverser knob;

a plurality of rollers disposed between said ratchet body and said driving member, wherein said plurality of rollers are retained in said cage spaces of said cage member respectively, wherein said plurality of pairs of resilient members is configured to apply a resilient bias force to said plurality of rollers respectively for restricting and maintaining each of said plurality of rollers upright in place within said cage space when each of said plurality of rollers is shifted and moved along a travel path thereof from a first position to a second position thereof on said driving member; and a reversing mechanism configured to shift said reverser knob and said driving member from a first angular displacement to a second angular displacement, wherein said cage member is adapted to shift each of said rollers from said first position to said second position thereof on said driving member when said reverser knob and said driving member are shifted from said first angular displacement to said second angular displacement.

2. The reversible ratchet tool, as recited in claim 1, wherein each pair of resilient members of said plurality of pairs of resilient members is coupled with two opposing sidewalls of said respective cage space respectively so as to reduce a travel distance of each of said rollers in said respective cage space and provide a resilient ability to ensure said rollers travelling within said cage spaces respectively in upright manner.

3. The reversible ratchet tool, as recited in claim 2, wherein said driving member has a shoulder facing a bottom side of the reverser knob and said reverser knob is made of magnetic attraction material and has at least a pair of pawl cavities intendedly formed in said bottom side of said reverser knob in a side by side manner and communicated with each other, wherein said reversing mechanism comprises at least one magnetic unit configured to be engaged in said shoulder of said driving member, wherein said at least one magnetic unit is sized to fit in either one of said pair of pawl cavities and retained in either one of said pair of pawl cavities by magnetic attraction force.

4. The reversible ratchet tool, as recited in claim 3, wherein said shoulder has at least one pocket formed therein facing said bottom side of said reverser knob, wherein said at least one magnetic unit is sized to partially fit and retain in said at least one pocket.

5. The reversible ratchet tool, as recited in claim 2, wherein said driving member further comprises a driving body arranged coaxially around said axle portion, wherein said driving body has a polygonal shape and an outer sector surface having a plurality of ramps, wherein said axle portion has an upper portion extended from said driving body to be fittingly fixed in said central aperture of said reverse knob to couple said driving member with said reverse knob and a lower portion downwardly extended from said driving body for integrally and coaxially connecting with a driver element, while said driving body is fittingly disposed in said cage cavity of said cage member, wherein in order to apply a torque from said rachet body to said driving member, said rollers are frictionally wedged between said inner surface of said ratchet body and said outer sector surface of said driving body of said driving member within said circular aperture of said rachet body, whereby said driving member is allowed to freely rotate in one direction within said circular aperture with respect to said ratchet body, but is locked up by said rollers when said driving member rotates in another direction with respect to said ratchet body for imparting torque from said ratchet body.

6. The reversible ratchet tool, as recited in claim 1, wherein each of said cage spaces contains a pair of resilient member of said plurality of pairs of resilient members which are coupled with two opposing sidewalls of said cage space, wherein said rollers disposed in said cage spaces respectively are each retained to be travelled between said pair of resilient members of said plurality of pairs of resilient members while allowing each of said rollers to move and shift between said pair of resilient member of said plurality of pairs of resilient members, such that a travel distance of each of said rollers in said respective cage space is reduced and a resilient ability to ensure said rollers travelling within said cage spaces respectively in upright manner is provided.

7. The reversible ratchet tool, as recited in claim 6, wherein said driving member further comprises a driving body arranged coaxially around said axle portion, wherein said driving body has a polygonal shape and an outer sector surface having a plurality of ramps, wherein said axle portion has an upper portion extended from said driving body to be fittingly fixed in said central aperture of said reverse knob to couple said driving member with said reverse knob and a lower portion downwardly extended from said driving body for integrally and coaxially connecting with a driver element, while said driving body is fittingly disposed in said cage cavity of said cage member, wherein in order to apply a torque from said rachet body to said driving member, said rollers are frictionally wedged between said inner surface of said ratchet body and said outer sector surface of said driving body of said driving member within said circular aperture of said rachet body, whereby said driving member is allowed to freely rotate in one direction within said circular aperture with respect to said ratchet body, but is locked up by said rollers when said driving member rotates in another direction with respect to said ratchet body for imparting torque from said ratchet body.

8. The reversible ratchet tool, as recited in claim 1, wherein each of said resilient members comprises a joint portion integrally connected to a sidewall of said cage space correspondingly, a first resilient arm upwardly, outwardly and inclinedly extended from said joint portion, and a second resilient arm downwardly, outwardly and inclinedly from said joint portion symmetrically in opposing direction with said first resilient arm to form a V shape, wherein a first inclined angle defined between said first resilient arm and said sidewall is equal to a second inclined angle defined between said second resilient arm and said sidewall.

9. The reversible ratchet tool, as recited in claim 8, wherein said driving member has a shoulder facing a bottom side of the reverser knob and said reverser knob is made of magnetic attraction material and has at least a pair of pawl cavities intendedly formed in said bottom side of said reverser knob in a side by side manner and communicated with each other, wherein said reversing mechanism comprises at least one magnetic unit configured to be engaged in said shoulder of said driving member, wherein said at least one magnetic unit is sized to fit in either one of said pair of pawl cavities and retained in either one of said pair of pawl cavities by magnetic attraction force.

10. The reversible ratchet tool, as recited in claim 9, wherein said shoulder has at least one pocket formed therein facing said bottom side of said reverser knob, wherein said at least one magnetic unit is sized to partially fit and retain in said at least one pocket.

11. The reversible ratchet tool, as recited in claim 8, wherein said driving member further comprises a driving body arranged coaxially around said axle portion, wherein said driving body has a polygonal shape and an outer sector surface having a plurality of ramps, wherein said axle portion has an upper portion extended from said driving body to be fittingly fixed in said central aperture of said reverse knob to couple said driving member with said reverse knob and a lower portion downwardly extended from said driving body for integrally and coaxially connecting with a driver element, while said driving body is fittingly disposed in said cage cavity of said cage member, wherein in order to apply a torque from said rachet body to said driving member, said rollers are frictionally wedged between said inner surface of said ratchet body and said outer sector surface of said driving body of said driving member within said circular aperture of said rachet body, whereby said driving member is allowed to freely rotate in one direction within said circular aperture with respect to said ratchet body, but is locked up by said rollers when said driving member rotates in another direction with respect to said ratchet body for imparting torque from said ratchet body.

12. The reversible ratchet tool, as recited in claim 1, wherein said cage member comprises an annular base and a plurality of fingers extended axially from a side of said annular base to define said cage spaces each being formed between two adjacent fingers of said plurality of fingers, wherein said rollers disposed in said cage spaces respectively are each retained to be travelled between a pair of adjacent fingers of said plurality of fingers of said cage member while allowing each of said rollers to move and shift between said respective pair of adjacent fingers of said plurality of fingers.

13. The reversible ratchet tool, as recited in claim 12, wherein said driving member has a shoulder facing a bottom side of said reverser knob, wherein said shoulder has at least one pocket formed therein and said reverser knob has at least a pair of pawl cavities intendedly formed at said bottom side of said reverser knob in a side by side manner and communicated with each other, wherein said reversing mechanism comprises at least one pawl spring retained in said at least one pocket and at least one pawl ball sized to fit in either one of said pair of pawl cavities and compressed between said pawl ball and said driving member.

14. The reversible ratchet tool, as recited in claim 13, wherein said shoulder has at least one pocket formed therein facing said bottom side of said reverser knob, wherein said at least one pawl ball is sized to partially fit and retain in said at least one pocket and said at least one pawl spring is compressed between said at least one pawl ball and said driving member.

15. The reversible ratchet tool, as recited in claim 1, wherein said driving member has a shoulder facing a bottom side of the reverser knob and said reverser knob is made of magnetic attraction material and has at least a pair of pawl cavities intendedly formed in said bottom side of said reverser knob in a side by side manner and communicated with each other, wherein said reversing mechanism comprises at least one magnetic unit configured to be engaged in said shoulder of said driving member, wherein said at least one magnetic unit is sized to fit in either one of said pair of pawl cavities and retained in either one of said pair of pawl cavities by magnetic attraction force.

16. The reversible ratchet tool, as recited in claim 15, wherein said shoulder has at least one pocket formed therein facing said bottom side of said reverser knob, wherein said at least one magnetic unit is sized to partially fit and retain in said at least one pocket.

17. The reversible ratchet tool, as recited in claim 15, wherein said at least one magnetic unit is integrally formed on said shoulder of said driving member.

18. The reversible ratchet tool, as recited in claim 15, wherein said at least one magnetic unit is in ball shape.

19. The reversible ratchet tool, as recited in claim 1, wherein said driving member further comprises a driving body arranged coaxially around said axle portion, wherein said driving body has a polygonal shape and an outer sector surface having a plurality of ramps, wherein said axle portion has an upper portion extended from said driving body to be fittingly fixed in said central aperture of said reverse knob to couple said driving member with said reverse knob and a lower portion downwardly extended from said driving body for integrally and coaxially connecting with a driver element, while said driving body is fittingly disposed in said cage cavity of said cage member, wherein in order to apply a torque from said rachet body to said driving member, said rollers are frictionally wedged between said inner surface of said ratchet body and said outer sector surface of said driving body of said driving member within said circular aperture of said rachet body, whereby said driving member is allowed to freely rotate in one direction within said circular aperture with respect to said ratchet body, but is locked up by said rollers when said driving member rotates in another direction with respect to said ratchet body for imparting torque from said ratchet body.

* * * * *